United States Patent Office 3,292,389
Patented Dec. 20, 1966

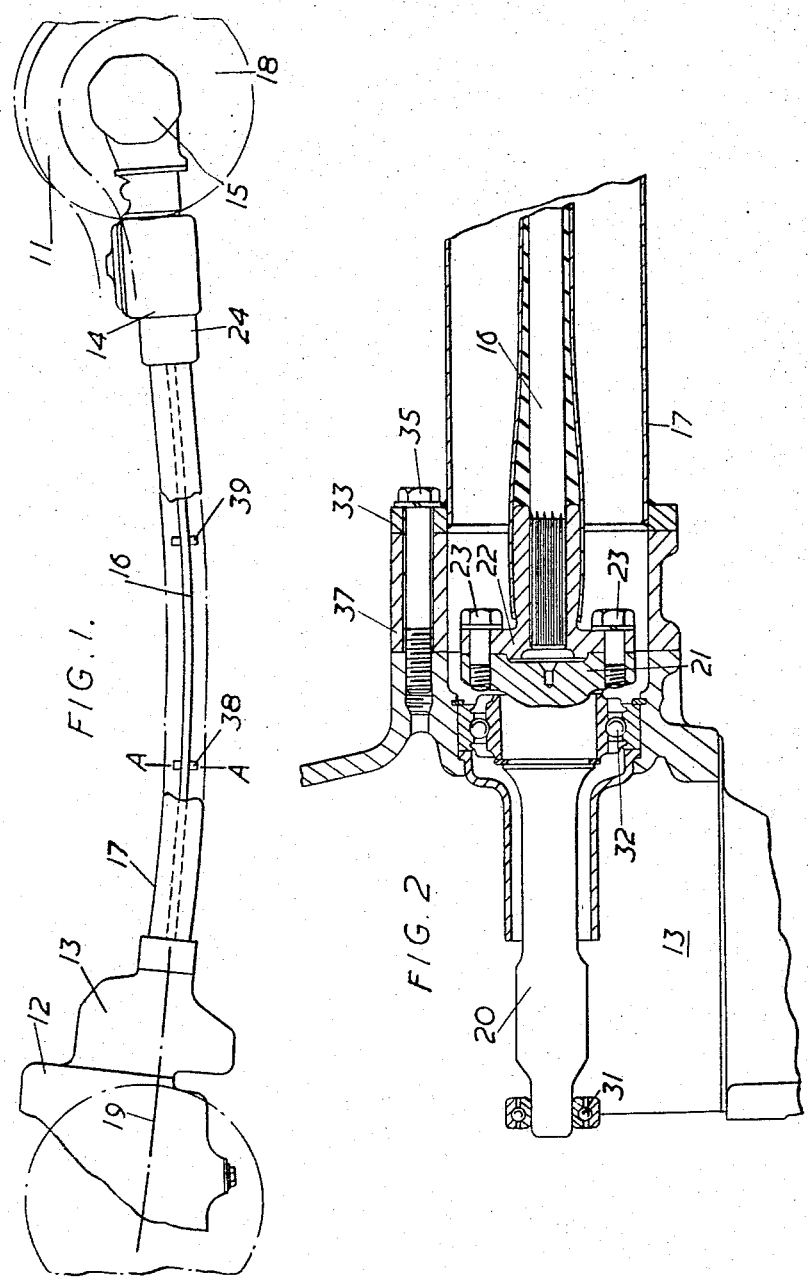

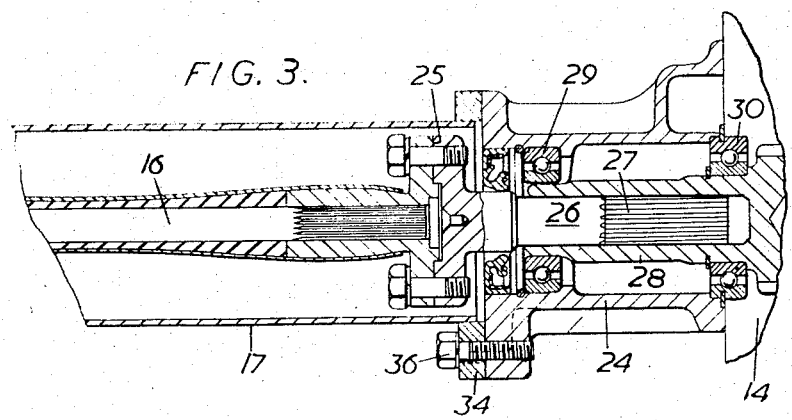
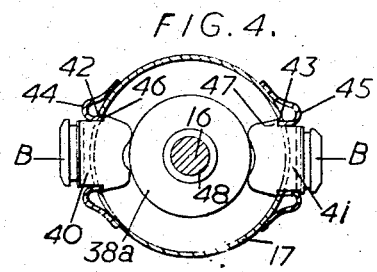
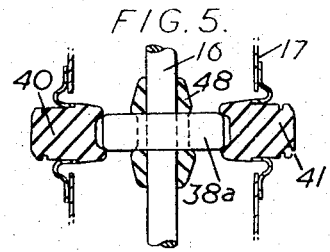
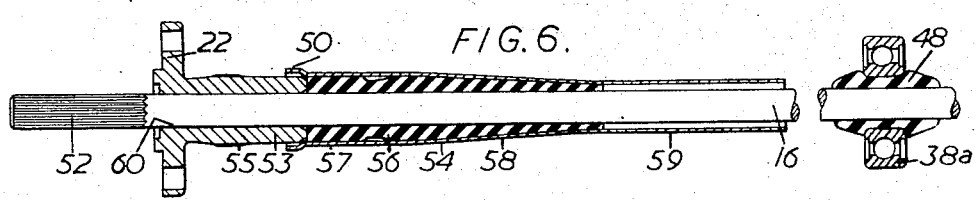
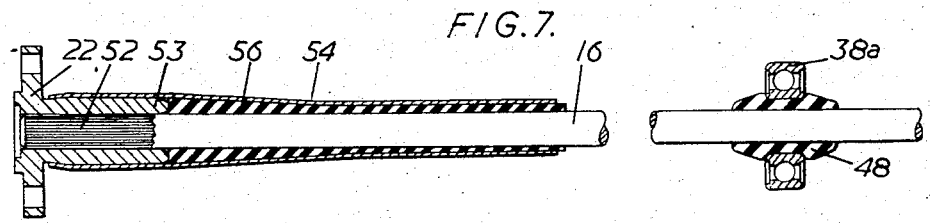

3,292,389
VIBRATION-DAMPED DRIVE SHAFT
Jakob August Adloff, Mainz-Gonsenheim, and Wilhelm Riehl, Raunheim am Main, Germany, assignors to General Motors Corporation, Detroit, Mich., a corporation of Delaware
Continuation of abandoned application Ser. No. 52,222, Aug. 26, 1960. This application Mar. 6, 1963, Ser. No. 264,474
Claims priority, application Germany, Sept. 2, 1959, O 6,956
5 Claims. (Cl. 64—1)

This is a continuation of United States application Serial No. 52,222 entitled "Vibration-Damped Drive Shaft," filed August 26, 1960, in the names of Jakob, August Adloff and Wilhelm Riehl, and now abandoned.

This invention relates to vibration-damped drive shafts, especially for motor vehicles.

Where relatively long drive shafts are used to transmit power between a motor vehicle engine and the rear axle, for example, the drive shafts are normally designed to be relatively stiff, so as to have a critical speed above their maximum operating speed. When the shafts are very long, bending vibrations sometimes occur in the shaft, usually at shaft speeds corresponding to sub-harmonics of the first mode natural frequency of the shaft. Such vibrations are generally controlled by a center bearing located at the center of the shaft to minimize the amplitude of vibration of the shaft.

If a relatively small-diameter curved torsionally resilient drive shaft is used, the shaft can rotate at speeds equal to or greater than the critical speed corresponding to the lowest natural frequency of a conventional non-curved shaft. This is because the critical speed corresponding to the lowest natural frequency vibrations is increased by stressing the shaft to curve it, whereby during rotation of the shaft the transmitted torque superimposes a rotating bending stress on the shearing stress. If the deflection of the drive shaft is downwards this has the additional advantage that, in the vicinity of the passenger space in a car, the shaft lies very low with its axis lower than the engine crankshaft and the input shaft of the rear axle drive. In this way it becomes possible to lower the vehicle floor and thus reduce the over-all height of the vehicle.

With the first mode natural frequency under control, the drive shaft can be rotated at higher speeds, which may include the speed corresponding to the second mode natural frequency or one of its major subharmonics. Since vibration in the second mode does not involve a change in the length of the shaft, the bending of the shaft has no appreciable effect on second mode vibrations. Control of this mode is possible, however, by supporting the shaft in bearings one-quarter and three-quarters of the way along it. These being the points of maximum amplitude for vibrations in the second mode.

To overcome the oscillations of the crankshaft as a whole initiated by the periodic operation of the engine and by its consequently fluctuating torque, it has been proposed to increase the inertia of the crankshaft against uneven rotation by means of a flywheel. However, the crankshaft and the remaining power transmission system may still constitute an oscillatory structure in itself, with its own natural frequency: to damp this rotary oscillation, particularly at resonance, complicated vibration dampers having approximately the size and weight of a flywheel have been proposed, but these damping devices not only are very expensive but also very considerably increase the weight of the vehicle.

It is accordingly one object of the present invention to damp the torsional and flexural oscillations of the drive shaft effectively by using simple means.

A further desideratum of a drive shaft is that there should be smooth transfer of the forces from the shaft to the members connected to its ends, for example, coupling flanges. With a conventional splined shaft connection it is usual for strength reasons to thicken the splined ends of the shaft, but this makes it difficult to obtain a smooth transition of forces between the thickened ends and the thinner middle portion of the shaft.

It is accordingly a further object of the present invention to obtain the desired smooth transition of forces in a simple manner, by relieving the splines of some of the torque they would otherwise have to transmit.

According to the invention, therefore, a vibration-damped drive shaft assembly comprises a torsionally resilient drive shaft which is rectilinear in the unstressed condition, a rotatable drive member, a boss on the rotatable drive member embracing one end portion of the drive shaft, a rotary driven member, a boss on the driven member embracing the other end portion of the drive shaft, bearing and clamping means stressing the ends of the drive shaft to maintain the shaft in a curved condition, a tube coaxial with each end portion of the drive shaft and surrounding the respective boss, and a sleeve of resilient material radially compressed between each tube and the respective end portion of the drive shaft.

The magnitude of the radial pressure developed in the resilient material between the drive shaft and the tube determines the relative proportions of the total torque transmitted by the splines and by the intermediate layer of resilient material. In addition, the intermediate layer of resilient material has excellent vibration damping properties, so that oscillations of the shaft are damped to a high degree, particularly when the shaft is rotating at resonance speeds. The vibration damping action of the intermediate layer of resilient material not only materially suppresses the rotational oscillations, however, it also damps any flexural oscillations which may develop.

The stiffening of the shaft ends in conjunction with the constrained deflection raises the critical speed of the first mode to a value which is generally not attained in operation of the shaft. The mountings at the points of maximum amplitude for second mode vibrations take care of these second mode vibrations.

Preferably these bearings consist of normal ball bearings the inner race of each of which is mounted on the drive shaft by way of a flexible collar and is secured in a protecting tube for the drive shaft in a plane at right angles to the plane of curvature by means of two resilient plugs. Support for the drive shaft in its plane of curvature is not necessary, since oscillations in this plane are insignificant because of the clamping needed to give the necessary bending of the shaft.

The scope of the monopoly is defined by the appended claims; the invention and how it may be performed are hereinafter particularly described with reference to the accompanying drawings, in which:

FIGURE 1 is a schematic representation of a motor vehicle power transmission incorporating one embodiment of a vibration-damped drive shaft assembly according to the invention;

FIGURE 2 is an enlarged longitudinal section through the front end of the drive shaft of the assembly shown in FIGURE 1;

FIGURE 3 is an enlarged longitudinal section through the rear end of the drive shaft of the assembly shown in FIGURE 1;

FIGURE 4 is a cross-section along the line A—A of FIGURE 1 on an enlarged scale;

FIGURE 5 is a cross-section along the line B—B of FIGURE 4;

FIGURE 6 shows a drive shaft of an assembly according to the invention prior to assembly with a coupling flange; and FIGURE 7 shows the same shaft in the assembled condition.

The power transmission shown in FIGURE 1 comprises a chassis frame 11 carrying an engine 12 and a clutch 13 at the front end, and a change-speed gear 14 in one assembly with a rear axle drive 15 at the rear end, of a one-piece stressed curved torsionally resilient drive shaft 16. For clarity, the chassis frame 11 is indicated only in the region of the rear axle. The drive shaft 16 is enclosed by a protecting tube 17 which rigidly connects the engine and clutch 12 and 13 to the change-speed gear and rear axle drive 14 and 15. The rear wheels 18 are driven by conventional swinging half-axles (not shown).

The axis 19 of the crankshaft of the engine 12 is aligned with the axis of an intermediate shaft 20 (FIGURE 2) in the clutch 13, and both these axes may be directed downwards towards the rear of the vehicle. A radial coupling flange 21 at one end of the shaft is firmly secured by bolts 23 to a corresponding coupling flange 22 connected to the drive shaft 16.

A bearing housing 24 (FIGURE 3) is bolted to the change-speed gear 14 and the rear end of the drive shaft 16 is connected to a stub shaft 26 by means of a shaft coupling 25 identical with that at the front end. The stub shaft 26 is joined to a hollow gear-input shaft 28 by way of a spline system 27 forming a rotationally rigid but axially displaceable connection. The hollow gear-input shaft 28 is mounted in two ball bearings 29 and 30 spaced from each other, and may be inclined downwardly in the forward direction.

Owing to the inclination of the intermediate shaft 20 in the clutch 13, and the inclination of the input shaft 28 which is disposed at the other end of the driving gear and is firmly connected to the drive shaft 16 by means of the rigid coupling flanges 21 and 22 and the coupling 25, the drive shaft 16 is bent downwards. The clamping moment at the front end of the shaft is taken up by the spaced ball bearings 31 and 32 for the intermediate shaft 20; the clamping moment at the flange-mounted bearing housing 24 at the rear end of the shaft 16 is taken up by the two bearings 29 and 30.

Flanges 33 and 34 are welded respectively to the front and the rear of the rigid protecting tube 17, and are connected by means of bolts 35 and 36, respectively, to the housing for the clutch 13 and to the bearing housing 24, and adaptor piece 37 being interposed in the connection at the clutch end.

On account of the deflection of the drive shaft 16, a rotating bending stress is superimposed upon the torque arising from the transmission of driving power from the engine 12 to the rear axle drive 15. At one-quarter and three-quarters of its length, i.e., at the points of maximum vibration amplitude for the second mode critical speed, the drive shaft 16 is mounted in bearings 38 and 39 (FIGURE 1).

As shown in FIGURES 4 and 5, the housing 38a for the ball bearing 38 (and similarly, though this is not shown, the housing for the ball bearing 39) need be secured in the horizontal plane only. The housing 38a is mounted by means of two horizontally disposed rubber plugs 40 and 41 inserted in two opposed apertures 42 and 43 in the protecting tube 17. A plate of sheet metal 44 and 45 is secured over each of the apertures 42 and 43, these plates having sprung inner edges engaging behind shoulders 46 and 47 of the plugs 40 and 41.

A rubber collar 48 is inserted between the drive shaft 16 and the inner race of the ball bearing 38 for the purpose of further damping.

FIGURES 6 and 7 illustrate the connection of the coupling flange 21 to the front end of the drive shaft 16, respectively before assembly and in the assembled condition.

The flange connections are the same at each end of the drive shaft, so that only one half of the drive shaft is indicated.

The drive shaft itself is a smooth bar, which advantageously is ground to shape by the centerless grinding method. The front end of the shaft has external splines 52 mating in a rotationally rigid and axially immovable manner with a boss 53 of the coupling flange 22. A coaxial tube 54 surrounds the boss 53 with a press fit on to knurling 55 applied to the boss. In addition, the forward end 50 of the coaxial tube is inturned.

A resilient sleeve 56 of rubber is disposed between the coaxial tube 54 and the drive shaft 16. The sleeve is under strong radial compression, owing to the coaxial tube 54 having been forced over it, with the result that a portion of the torque delivered by the engine to the coupling flange 22, and so to the coaxial tube 54 rigidly connected to the boss of the coupling flange, is transmitted to the drive shaft by the sleeve. The splines 52 are thereby relieved of some of the load; the splined end of the drive shaft can consequently be made of the same thickness as the rest of the shaft.

Assembly is effected by first pushing the rubber collar 48 and the ball bearing 38 on to the drive shaft (and similarly at the rear end), whereupon the coaxial tube 54, the rubber sleeve 56 and the coupling flange 22 are pushed on, and the end of the tube is knurled. The coaxial tube 54 consists essentially of a thicker cylindrical section 57, which is pushed on to the boss 53, a tapering section 58, and a thinner cylindrical section 59. Further, the ratio of the length of the smaller cylindrical section 59 to the length of the larger section 57 may be equal to the ratio of the annulus area between the larger section 57 and drive shaft 16 to the annulus area between the between smaller section 59 and drive shaft 16. In the undeformed state, the rubber sleeve 56 has a shape which corresponds somewhat to the annular space between the thicker cylindrical section 57 of the tube, the tapering section 58 on the tube, and the drive shaft 16. When the individual parts are as shown in FIGURE 6, assembly is completed by pressing the tube 54 against the boss 53 of the coupling flange 22. During assembly, the rubber sleeve 56 situated between the drive shaft 16 and the coaxial tube 54 is pushed into the narrow annular space between the drive shaft and the thinner cylindrical tube section 59, and finally fills up the remaining annular space between the shaft 16 and the coaxial tube 54. At the same time the drive shaft 16 with its splines 52 is pressed into the bore 60 of the boss 53. Depending on the shape, prestressing and hardness of the rubber sleeve 56, a greater or lesser proportion of the torque is transmitted by the sleeve during operation.

What is claimed is:

1. Vibration damping means for a torsionally resilient drive shaft having a driving end and a driven end and comprising an end member embracing one of said ends of said shaft and rotatable therewith, means securing said end member to said one end of said shaft for transmitting driving torque therebetween, a tube coaxial with said one end of said shaft and secured to said end member for rotation therewith and a sleeve or resilient material radially compressed between said tube and said one end of said shaft and adjacent said end member to transmit a portion of the driving torque transmitted between said shaft and said end member and to damp torsional vibrations therein, said coaxial tube having a larger cylindrical end portion secured to said end member and a smaller cylindrical end portion surrounding said drive shaft and a tapered intermediate portion, the ratio of the length of said smaller cylindrical end portion to the length of said larger cylindrical end portion being equal to the ratio of the annulus area between said larger cylindrical end portion and said shaft to the annulus area between said smaller cylindrical end portion and said shaft.

2. A torsionally resilient drive shaft assembly comprising
a torsionally resilient shaft having a driving end and a driven end and having a constant diameter throughout its length,
an end member embracing one of said ends of said shaft and rotatable therewith,
means securing said end member to said one end of said shaft for transmitting driving torque therebetween, said securing means reducing the strength in torsion of said shaft end,
a tube coaxial with said one end of said shaft and secured to said end member for rotation therewith and
a sleeve of resilient material radially compressed between said tube and said one end of said shaft adjacent to and inwardly of said end member to transmit a portion of the driving torque transmitted between said shaft and said end member and to damp torsional vibrations in said assembly.

3. The drive shaft assembly set forth in claim 2 wherein said means securing said end member to said one end of said shaft includes an external spline formed on said shaft one end and an internal spline formed in said end member and in engagement with said spline on said one end of said shaft.

4. The drive shaft assembly set forth in claim 2 wherein said coaxial tube has a larger cylindrical end portion secured to said end member and a smaller cylindrical end portion surrounding said drive shaft and a tapered intermediate portion.

5. A torsionally resilient drive shaft assembly comprising
a torsionally resilient shaft having driving and driven ends and having a constant diameter throughout its length,
end members one embracing each of said ends of said shaft and rotatable therewith,
means securing said end members to said shaft ends for transmitting torque therebetween said securing means reducing the strength in torsion of said shaft ends, as compared to the remainder of said shaft,
tubes disposed one at each end of said shaft and coaxial therewith, each of said tubes secured to one of said end members for rotation therewith and
sleeves of resilient material, one compressed between each of said tubes and the ends of said shaft inwardly of and adjacent said end members to transmit a portion of the torque transmitted between said shaft and said end members and to damp torsional vibrations in said drive shaft assembly.

References Cited by the Examiner

UNITED STATES PATENTS

| | | | |
|---|---|---|---|
| 2,220,751 | 11/1940 | Bergman | 64—1 |
| 2,691,283 | 10/1954 | Stover | 64—11 |
| 2,797,562 | 7/1957 | Forgash | 64—11 |
| 2,900,809 | 8/1959 | Crankshaw | 64—11 |
| 3,155,187 | 11/1964 | De Lorean | 180—70 |

FOREIGN PATENTS 805,626    11/1936    France.

A. HARRY LEVY, *Primary Examiner.*